(12) United States Patent
Fermann

(10) Patent No.: US 9,819,141 B2
(45) Date of Patent: Nov. 14, 2017

(54) COMPACT FIBER SHORT PULSE LASER SOURCES

(71) Applicant: IMRA America, Inc., Ann Arbor, MI (US)

(72) Inventor: Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 15/146,675

(22) Filed: May 4, 2016

(65) Prior Publication Data

US 2016/0248217 A1    Aug. 25, 2016

Related U.S. Application Data

(63) Continuation of application No. PCT/US2014/063822, filed on Nov. 4, 2014.
(Continued)

(51) Int. Cl.
*H01S 3/11* (2006.01)
*H01S 3/067* (2006.01)
(Continued)

(52) U.S. Cl.
CPC .......... *H01S 3/1112* (2013.01); *H01S 3/0675* (2013.01); *H01S 3/06712* (2013.01);
(Continued)

(58) Field of Classification Search
CPC .. H01S 3/1112; H01S 3/06712; H01S 3/0675; H01S 3/1055; H01S 3/1067;
(Continued)

(56) References Cited

U.S. PATENT DOCUMENTS

| | | |
|---|---|---|
| 5,365,531 A | 11/1994 | Lin et al. |
| 5,450,427 A | 9/1995 | Fermann et al. |

(Continued)

FOREIGN PATENT DOCUMENTS

| | | | |
|---|---|---|---|
| DE | EP 2637265 A1 * | 9/2013 | ......... H01S 3/06791 |
| EP | 2637265 A1 | 9/2013 | |

(Continued)

OTHER PUBLICATIONS

Aguergaray et al., "Mode-locked femtosecond all-normal all-PM Yb-doped fiber laser using a nonlinear amplifying loop mirror", Optics Express, vol. 20, No. 10, May 7, 2012, pp. 10545-10577.
(Continued)

*Primary Examiner* — Xinning Niu
(74) *Attorney, Agent, or Firm* — Knobbe, Martens, Olson & Bear, LLP

(57) ABSTRACT

Examples of robust self-starting passively mode locked fiber oscillators are described. In certain implementations, the oscillators are configured as Fabry-Perot cavities containing an optical loop mirror on one cavity end and a bulk mirror or saturable absorber on the other end. The loop mirror can be further configured with an adjustable line phase delay to optimize modelocking. All intra-cavity fiber(s) can be polarization maintaining. Dispersion compensation components such as, e.g., dispersion compensation fibers, bulk diffraction gratings or fiber Bragg gratings may be included. The oscillators may include a bandpass filter to obtain high pulse energies when operating in the similariton regime. The oscillator output can be amplified and used whenever high power short pulses are required. For example the oscillators can be configured as frequency comb sources or supercontinuum sources. In conjunction with repetition rate modulation, applications include dual scanning delay lines and trace gas detection.

28 Claims, 6 Drawing Sheets

Related U.S. Application Data

(60) Provisional application No. 61/903,088, filed on Nov. 12, 2013.

(51) Int. Cl.
*H01S 3/1055* (2006.01)
*H01S 3/106* (2006.01)
*H01S 3/107* (2006.01)
*H01S 3/13* (2006.01)
*H01S 3/16* (2006.01)

(52) U.S. Cl.
CPC .......... *H01S 3/06725* (2013.01); *H01S 3/107* (2013.01); *H01S 3/1055* (2013.01); *H01S 3/1067* (2013.01); *H01S 3/1115* (2013.01); *H01S 3/1307* (2013.01); *H01S 3/161* (2013.01); *H01S 3/1616* (2013.01); *H01S 2301/085* (2013.01)

(58) Field of Classification Search
CPC .. H01S 3/1616; H01S 3/06725; H01S 3/1115; H01S 3/1307; H01S 3/161; H01S 3/107; H01S 2301/085
See application file for complete search history.

(56) References Cited

U.S. PATENT DOCUMENTS

| | | | |
|---|---|---|---|
| 6,560,251 B1* | 5/2003 | Jeon | H01S 3/06791 372/31 |
| 6,885,683 B1 | 4/2005 | Fermann et al. | |
| 6,956,887 B2 | 10/2005 | Jiang et al. | |
| 7,088,756 B2 | 8/2006 | Fermann et al. | |
| 7,453,913 B2 | 11/2008 | Jiang et al. | |
| 7,649,915 B2 | 1/2010 | Fermann et al. | |
| 7,782,910 B2 | 8/2010 | Fermann et al. | |
| 8,120,778 B2 | 2/2012 | Fermann et al. | |
| 2002/0176452 A1* | 11/2002 | Lin | H01S 3/067 372/18 |
| 2004/0071181 A1* | 4/2004 | Huang | H01S 5/06256 372/106 |
| 2005/0238363 A1* | 10/2005 | Jennen | H04B 10/69 398/152 |
| 2006/0113287 A1 | 6/2006 | Inada et al. | |
| 2011/0080580 A1 | 4/2011 | Fermann et al. | |
| 2012/0133931 A1* | 5/2012 | Fermann | G01J 3/10 356/300 |
| 2012/0205352 A1 | 8/2012 | Fermann | |
| 2012/0327959 A1 | 12/2012 | Fermann et al. | |
| 2013/0163624 A1* | 6/2013 | Miyanaga | G02F 1/01 372/26 |
| 2014/0264031 A1 | 9/2014 | Fermann et al. | |

FOREIGN PATENT DOCUMENTS

| | | |
|---|---|---|
| JP | 2005-288503 A | 10/2005 |
| JP | 2006-150385 A | 6/2006 |
| WO | WO 2015/073257 | 5/2015 |

OTHER PUBLICATIONS

Bollond et al., "Characterization of nonlinear switching in a figure-of-eight fiber laser using frequency-resolved optical gating", IEEE Photonics Technology Letters, vol. 10, No. 3, Mar. 1, 1998, pp. 343-345.

Chernysheva et al., "Nonlinear Amplifying Loop-Mirror-Based Mode-Locked Thulium-Doped Fiber Laser", IEEE Photonics Technology Letters, vol. 24, No. 14, Jul. 1, 2012, pp. 1254-1256.

Fermann et al., "Nonlinear amplifying loop mirror", Optics Letters, vol. 15, Issue 13, Jul. 1, 1990, pp. 752-754.

Fermann et al., "Additive-pulse-compression mode locking of a neodymium fiber laser", Optics Letters, vol. 16, No. 4, Feb. 15, 1991, pp. 244-246.

Gordon et al., "Self-starting of passive modelocking", Optics Express, vol. 14, No. 23, Nov. 13, 2006, pp. 11142-11154.

Li et al., "Starting dynamics of dissipative-soliton fiber laser", Optics Letters, vol. 15, No. 14, Jul. 15, 2010, pp. 2403-2405.

Li et al., "Rational harmonic active and passive modelocking in a figure-of-eight fibre laser", Electronics Letters, vol. 34, No. 4, Feb. 19, 1998, pp. 375-376.

Morioka et al., "Ultrafast All-Optical Switching Utilizing the Optical Kerr Effect in Polarization-Maintaining Single-Mode Fibers", IEEE Journal of Selected Areas in Communications, vol. 6, No. 7, Aug. 1, 1988, pp. 1186-1198.

Nakazawa et al., "Low Threshold, 290 fs Erbium-Doped Fiber Laser With a Nonlinear Amplifying Loop Mirror Pumped by InGaAsP Laser Diodes", Applied Physics Letters, American Institute of Physics, vol. 59, No. 17, Oct. 21, 1991, pp. 2873-2875.

Nicholson et al., "A polarization maintaining, dispersion managed, femtosecond figure-eight laser", Optics Express, vol. 14, No. 18, Sep. 4, 2006, pp. 8160-8167.

Tamura et al., "Unidirectional ring resonators for self-starting passively mode locked lasers", Optics Letters, vol. 18, No. 3, Feb. 1, 1993, pp. 220-222.

Translation of Notification of Reasons for Refusal in Japanese Patent Application No. 2014-258750, owned by IMRA America, Inc., dated Dec. 9, 2015, in 5 pages.

International Search Report and Written Opinion for international application No. PCT/US2014/063822, owned by IMRA America, Inc., dated Mar. 27, 2015.

International Preliminary Report on Patentability for international application No. PCT/US2014/063822, owned by IMRA America, Inc., dated May 26, 2016.

\* cited by examiner

COMPACT FIBER SHORT PULSE LASER SOURCES

CROSS-REFERENCE TO RELATED APPLICATIONS

This application is a continuation of international application no. PCT/US2014/063822, filed Nov. 4, 2014, titled "COMPACT FIBER SHORT PULSE LASER SOURCES," which claims the benefit of priority to U.S. Patent Application No. 61/903,088, filed Nov. 12, 2013, titled "COMPACT FIBER SHORT PULSE LASER SOURCES;" each of which is hereby incorporated by reference herein in its entirety.

BACKGROUND

Field

The disclosure relates to compact, high brightness, mode locked fiber laser based short pulse light sources and examples of applications thereof.

Description of the Related Art

Pulse sources based on mode locked fiber lasers are finding many applications in industry and medicine as well precision spectroscopy. The universality of this technology is exemplified by the many different applications that have been pursued comprising, heavy duty machining, precision ophthalmological surgery, medical imaging as well as precision metrology. Early passively mode locked fiber lasers were based on nonlinear amplifying loop mirrors (NALMs) as for example described in Fermann et al., 'Additive-pulse-compression mode locking of a neodymium fiber laser', Opt. Lett., Vol. 16, Issue 4, pp. 244-246 (1991). Another arrangement included a FIG. 8 laser (F8L) in order to initiate mode locking and to generate short optical pulses at high repetition rates, as disclosed in U.S. Pat. No. 5,365,531: "Apparatus and method for initializing an optical-fiber laser for mode-locking". For commercial applications reliability and robustness of the mode locked lasers is very much a premium.

Previously, robust mode locked fiber laser light sources have been constructed using polarization maintaining components as well as saturable absorbers as for example disclosed in U.S. Pat. No. 7,088,756, "Polarization maintaining dispersion controlled fiber laser source of ultrashort pulses". To maximize the output power from mode locked fiber lasers, previously mode locked operation in the similariton regime has been implemented as discussed in U.S. Pat. No. 7,782,910, "Single-polarization high power fiber lasers and amplifiers", to Fermann et al. and U.S. Patent Application Pub. No. 2012/0205352, "Compact, coherent, high brightness light sources for the mid and far IR".

To start the modelocking process, the use of ring laser cavities has been suggested as described in K. Tamura et al., 'Unidirectional ring resonators for self-starting passively mode locked lasers', Opt. Lett., vol. 18, pp. 220-222 (1993). Ring laser cavities are less susceptible to spurious intracavity reflections, which are generally believed to inhibit self-starting operation. According to recent theories, self-starting modelocking involves a noise activated crossing of an entropic barrier as described in A. Gordon et al., 'Self-starting of passive modelocking', Opt. Express, vol. 14, pp. 11142-11154 (2006). To cross the barrier to modelocking, laser cavities have been used that allow for Q-switching operation before transitioning to cw mode locked operation, as discussed in U.S. Pat. No. 6,956,887 ('887) and U.S. Pat. No. 7,453,913 ('913), "Resonant Fabry-Perot semiconductor saturable absorbers and two photon absorption power limiters". To facilitate the evolution from Q-switching to modelocking and to prevent damage to optical components inside the laser, two photon peak power limiters have been implemented as also discussed in '887 and '913. The benefits of Q-switched operation (or sometimes referred to also as relaxation oscillations) in the transitioning to modelocking have recently been further confirmed by H. Li et al., 'Starting dynamics of dissipative-soliton fiber laser', Opt. Lett., vol. 15, pp. 2403-2405 (2010), but only for ring cavities.

SUMMARY

Examples of a saturable-absorber-free mode locked fiber laser design are disclosed, which may be applicable to even the most demanding applications of fiber lasers. In some embodiments, to increase or maximize the output powers of the fiber lasers, operation in the similariton regime is implemented, where sensitivity against environmental perturbations and thermal fluctuations is reduced using polarization maintaining construction. A nonlinear amplifying loop mirror (NALM) can be used to initiate Q-switching and facilitates a transition to mode locked operation, thereby ensuring reliable self-starting of modelocking. Non-reciprocal phase shifters as well as active phase control can be implemented to further improve and stabilize the modelocking performance. All-fiber systems can also be constructed.

To reduce the required power for the transition from Q-switching to mode locked laser operation, operation with partial dispersion compensation in the soliton regime can be implemented. Also, the incorporation of highly nonlinear fibers into the cavity and operation near zero dispersion may be beneficial. High power similariton fiber lasers can also be constructed by the incorporation of appropriate bandpass filters or using the gain medium itself as a bandpass filter.

Frequency combs with a stable frequency comb spectrum can be constructed with the help of repetition rate and carrier envelope offset frequency $f_{ceo}$ control. Carrier envelope off set frequency $f_{ceo}$ can be controlled by pump power modulation or loss modulation inside the cavity. A graphene modulator can be used for high bandwidth loss modulation in some systems.

Mode locked fiber lasers based on any rare-earth dopant can be constructed, such as Nd, Yb, Er, Tm, Ho, Dy or combinations thereof.

The repetition rate of these sources can be controlled by phase locking to a radio frequency (RF) reference. The repetition rate of these sources can also be modulated to enable the construction of scanning delay lines. Also, repetition rate modulation can be used in trace gas detection systems in conjunction with enhancement cavities.

In conjunction with additional amplifiers and highly nonlinear fibers, broadband supercontinuum generation can be obtained.

In a first aspect, an example of a passively mode locked fiber oscillator evolving from Q-switching comprises a Fabry-Perot cavity comprising: a nonlinear fiber amplifying loop mirror (NALM) at a first cavity end, said nonlinear loop mirror configured to allow the insertion of a linear phase delay along two propagation directions of said nonlinear loop mirror, wherein said passively mode locked fiber oscillator comprises polarization maintaining (PM) fiber.

In a second aspect, the passively mode locked fiber oscillator according to aspect 1 is arranged such that mode locking of said oscillator evolves via suppression of Q-switching.

In a third aspect, the passively mode locked fiber oscillator according to any one of aspects 1-2, wherein said loop mirror comprises an orthogonal splice configured to induce said phase delay, and a temperature control device configured to control the temperature of a section of intra-loop fiber.

In a fourth aspect, the passively mode locked fiber oscillator according to aspect 3, further comprising a mirror or a saturable absorber or a mirror with a saturable absorber at a second cavity end; and a Faraday rotator inserted proximate to said second cavity end to compensate for a polarization rotation induced by said orthogonal splice.

In fifth aspect, the passively mode locked fiber oscillator according to any one of aspects 1-4, wherein said linear phase delay is stabilized using feedback from the output power of the oscillator.

In a sixth aspect, the passively mode locked fiber oscillator according to any one of aspects 1-5, wherein said linear phase delay is used to control a carrier envelope offset frequency of said oscillator.

In a seventh aspect, the passively mode locked fiber oscillator according to any one of aspects 1-6, wherein said linear phase delay is induced using a non-reciprocal phase shifter.

In an eighth aspect, the passively mode locked fiber oscillator according to any one of aspects 1-7, wherein said fiber oscillator further comprises a bulk diffraction grating disposed in said cavity for dispersion control of said passively mode locked fiber oscillator.

In a ninth aspect, the passively mode locked fiber oscillator according to any one of aspects 1-8, wherein said fiber oscillator further comprises undoped positive dispersion fiber disposed in said cavity for dispersion control of said polarization maintaining passively mode locked fiber oscillator.

In a tenth aspect, the passively mode locked fiber oscillator according to any one of aspects 1-9, wherein said oscillator further comprises undoped negative dispersion photonic crystal fiber disposed in said cavity for dispersion control of said passively mode locked fiber oscillator.

In an eleventh aspect, the passively mode locked fiber oscillator according to any one of aspects 1-10, further comprising a narrow bandpass optical filter, wherein said oscillator generates a pulse bandwidth larger than the bandwidth of said optical filter.

In a twelfth aspect, the passively mode locked fiber oscillator according to any one of aspects 1-11, further comprising a mirror at a second cavity end, said mirror configured to allow modulation or scanning of the repetition rate of said oscillator in response to a control signal, wherein said mode locked fiber oscillator is configured in a coherent dual scanning laser (CDSL) or coherent scanning laser (CSL) configuration.

In a thirteenth aspect, the passively mode locked fiber oscillator according to any one of aspects 1-12, further comprising a mirror at a second cavity end, said mirror configured to allow modulation or scanning of the repetition rate of said oscillator in response to a control signal, wherein said mode locked fiber oscillator is configured in a trace gas detection system which includes an enhancement cavity In a fourteenth aspect, the passively mode locked fiber oscillator according to any one of aspects 1-13, wherein said passively mode locked fiber oscillator is arranged in an all-PM configuration.

In a fifteenth aspect, the passively mode locked fiber oscillator according to any one of aspects 1-14, wherein said Fabry-Perot cavity comprises a reflective optic at a second cavity end.

In a sixteenth aspect, the passively mode locked fiber oscillator according to aspect 15, wherein the reflective optic comprises a mirror, a saturable absorber, or a combination of a mirror with a saturable absorber.

In a seventeenth aspect, the passively mode locked fiber oscillator according to any one of aspects 1-16, wherein the cavity further comprises an electro-optic modulator.

In an eighteenth aspect, the passively mode locked fiber oscillator according to any one of aspects 1-17, wherein the cavity further comprises a loss modulator.

In a nineteenth aspect, the passively mode locked fiber oscillator according to aspect 18, wherein the loss modulator comprises a graphene modulator.

In a twentieth aspect, the passively mode locked fiber oscillator according to any one of aspects 1-19, wherein said NALM is configured as an optical limiting element.

In a twenty-first aspect, the passively mode locked fiber oscillator according to aspect 20, wherein the NALM optical limiting element is further configured to produce a fiber oscillator output with a root mean square intensity noise (MN) less than −140 dBc/Hz at least at one frequency in a range from 100 kHz to 1 MHz.

In a twenty-second aspect, the passively mode locked fiber oscillator according to any one of aspects 1-21, configured as a frequency comb.

In a twenty-third aspect, a passively mode locked fiber oscillator, evolving from Q-switching, comprises a laser cavity comprising: a nonlinear fiber amplifying loop mirror, said nonlinear loop mirror configured to allow the insertion of a linear phase delay along two propagation directions of said nonlinear loop mirror, wherein said cavity is configured without any saturable absorber and is configured with polarization maintaining (PM) components in an all-PM or nearly all-PM configuration.

In a twenty-fourth aspect, the passively mode locked fiber oscillator according to aspect 23, wherein said loop mirror comprises an orthogonal splice configured to induce said linear phase delay, and a temperature control device configured to control temperature of a section of intra-loop fiber.

In a twenty-fifth aspect, the passively mode locked fiber oscillator according to any one of aspects 23-24, wherein said linear phase delay is induced using a non-reciprocal phase shifter.

In a twenty-sixth aspect, the passively mode locked fiber oscillator according to any one of aspects 23-25, wherein the cavity further comprises an electro-optic modulator.

In a twenty-seventh aspect, the passively mode locked fiber oscillator according to aspect 26, wherein said electro-optic modulator is configured to initiate modelocking of said mode locked fiber oscillator.

In a twenty-eighth aspect, the passively mode locked fiber oscillator according to any one of aspects 23-27, wherein the cavity further comprises a loss modulator.

In a twenty-ninth aspect, the passively mode locked fiber oscillator according to aspect 28, wherein the loss modulator comprises a graphene modulator.

A passively mode locked fiber oscillator according to any of the preceding aspects, further comprising a saturable absorber mirror at a second cavity end, said saturable absorber mirror configured to facilitate the transition from Q-switching to modelocking. The passively mode locked fiber oscillator according to any of the preceding aspects, further comprising an electro-optic modulator, said electro-optic modulator configured to facilitate the transition from Q-switching to modelocking. The passively mode locked fiber oscillator according to any of the preceding aspects, wherein said nonlinear fiber amplifying loop mirror is configured as an optical limiter, thereby reducing the root-mean square intensity or RIN of said oscillator. The passively mode locked fiber oscillator according to any of the aspects or embodiments described herein, wherein the oscillator is configured as a frequency comb.

The foregoing and other aspects, embodiments, and examples will be described with reference to the figures and the following detailed description.

The figures depict various embodiments of the present disclosure for purposes of illustration and are not intended to be limiting. Alternative embodiments of the systems and methods illustrated herein may be employed without departing from the principles described herein. Additional figures schematically illustrating additional embodiments of the disclosure are included in the various patents, patent publications, and patent applications incorporated by reference herein. Reference will now be made in detail to several embodiments, examples of which are illustrated in the accompanying figures. It is noted that wherever practicable similar or like reference numbers may be used in the figures and may indicate similar or like functionality.

DETAILED DESCRIPTION

The following U.S. patents and applications, assigned to the assignee of the present invention, relate to mode locked laser based systems and/or various applications thereof, for example frequency comb generation: U.S. Pat. No. 5,450,427, "Technique for the generation of optical pulses in modelocked lasers by dispersive control of the oscillation pulse width"; U.S. Pat. No. 6,885,683, "Modular, high energy, widely-tunable ultrafast fiber source"; U.S. Pat. No. 7,649,915, "Pulsed laser sources"; U.S. Pat. No. 7,782,910, "Single-polarization high power fiber lasers and amplifiers"; U.S. Pat. No. 8,120,778, "Optical scanning and imaging systems based on dual pulsed laser systems" ('778), U.S. Patent Application Pub. No. 2011/0080580, "Optical signal processing with modelocked lasers" ('580); U.S. Patent Application Pub. No. 2012/0205352, "Compact, coherent, high brightness light sources for the mid and far IR", U.S. Patent Application Pub. No. 2012/0133931, "Frequency comb source with large comb spacing"; U.S. Patent Application Pub. No. 2012/0327959, "Compact optical frequency comb systems"; U.S. Patent Application No. 61/793,913, "Trace Gas Detection System", filed Mar. 15, 2013 (the '3913 provisional application). Each of the above patents, patent publications, and patent applications is hereby incorporated by reference in its entirety to form part of this specification.

Figure 1:
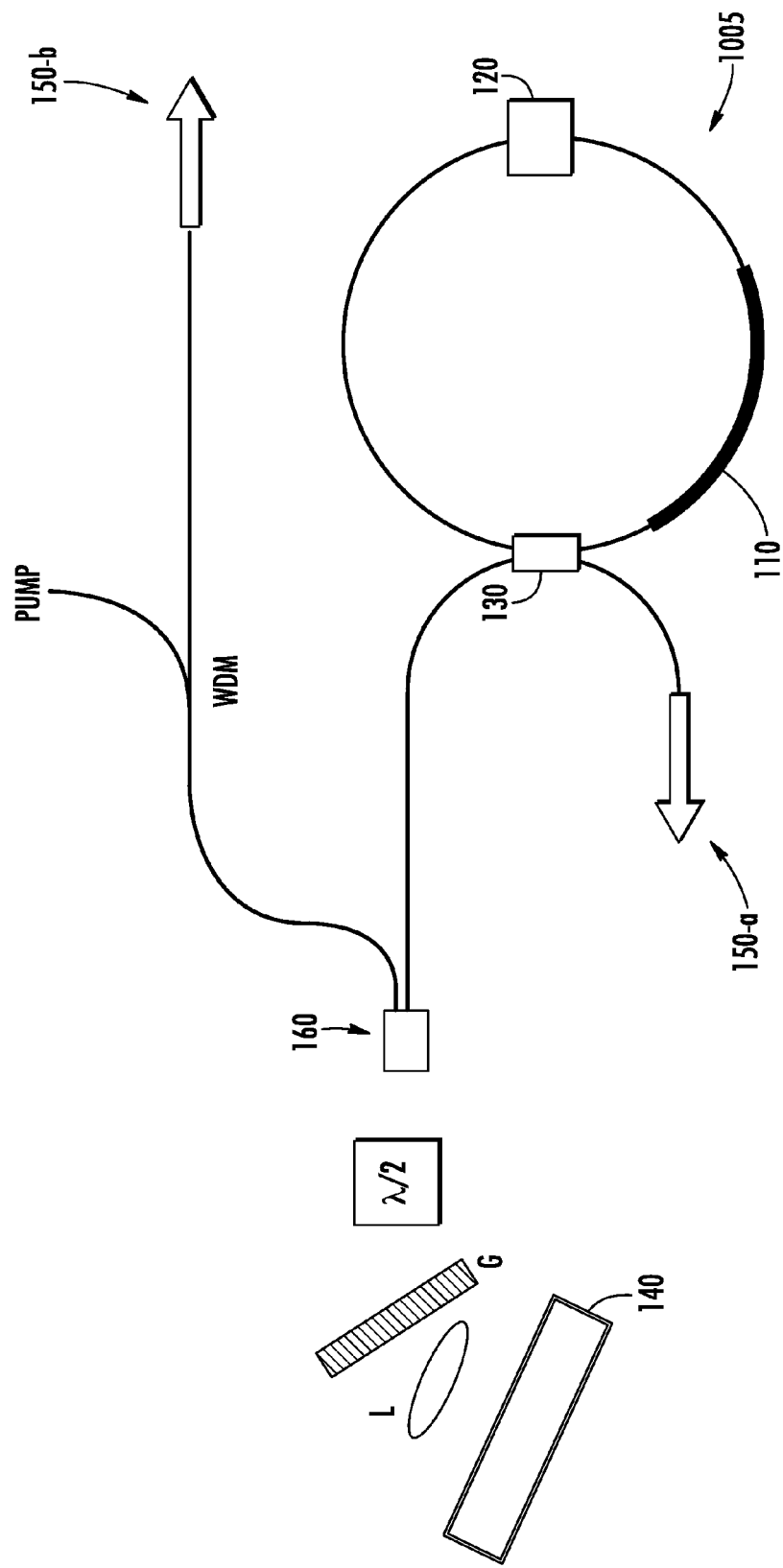
FIG. 1 schematically illustrates an example of a passively mode locked polarization-maintaining Tm fiber laser with bulk dispersion control.

FIG. 1 shows an example of a self-starting polarization maintaining (PM) fiber laser incorporating a nonlinear amplifying loop mirror (NALM) 1005 with dispersion control. The NALM 1005 can be arranged in a F8L configuration in some implementations. The Fabry-Perot cavity includes on the left cavity end a cavity end mirror 140, a lens L and a single bulk grating G to implement positive dispersion so as to compensate for the negative dispersion of intra-cavity fibers, for example intra-cavity gain fiber 110, or any other active or passive fibers. Such dispersion compensation components were for example described in U.S. Patent Application Pub. No. 2012/0133931, "Frequency comb source with large comb spacing", to Fermann et al., which is hereby incorporated by reference in its entirety for all it discloses, and are not further discussed here. The cavity also includes a half-wave plate ($\lambda/2$) to align the polarization of the intra-cavity fiber with the minimal loss axis of the bulk grating G. Alternatively, a grating or prism pair could also be used for dispersion compensation. A fiber coupler 130 is included with a selectable splitting ratio, $x/(1-x)$. The right hand side of the Fabry-Perot cavity comprises the NALM 1005 at the cavity end incorporating an asymmetrically located fiber amplifier 110, which may include a Tm doped fiber (or other type of rare-earth doped fiber). A non-reciprocal phase shifter 120 provides an appropriate phase bias for the NALM. Such non-reciprocal phase shifters were for example described in U.S. Pat. No. 5,450,427, "Technique for the generation of optical pulses in modelocked lasers by dispersive control of the oscillation pulse width" to Fermann et al., which is hereby incorporated by reference in its entirety for all it discloses. Such a non-reciprocal phase-shifter may include two Faraday rotators with a phase plate sandwiched in-between.

To reduce the modelocking threshold, a section of highly nonlinear fiber (not shown) can also be spliced either inside the NALM 1005 or in the fiber lead that comprises the intra-cavity fiber 160 end of the NALM. An output from the system can be extracted from the extra-cavity NALM output (150-*a*) or through the wavelength division multiplexing (WDM) collimator 160 to output 150-*b*. Alternatively, the zero—order output of the grating G can also be used. The pump light is provided through the WDM-collimator 160, which may be an integrated commercially available unit. An external WDM coupler separates the pump light from the output light as shown. Other arrangements and other pump configurations can also be used; for example, conventional WDM couplers can be incorporated to provide the pump light. Such WDM couplers can be spliced into the NALM loop. The NALM coupler can have a coupling ratio of 50/50, though other coupling ratios in the range from 1/99 to 50/50 can also be used, e.g., x can be in the range from 0.01-0.5. In at least one preferred implementation all fiber components are polarization maintaining (PM) and spliced together with minimal polarization cross coupling to enable polarization maintaining operation.

The mirror 140 can also be replaced with a saturable absorber mirror to simplify the transition from Q-switching to mode locked operation. However, the present arrangement has the benefit that no saturable absorber is required and an all-PM cavity construction, or a nearly all-PM fiber configuration with few bulk optical components for maintaining or controlling polarization, is feasible. As used herein, predominantly PM refers to an arrangement in which a great extent of the components are PM, and is to be understood as including an "all PM" configuration and a "nearly all-PM" configuration. As used herein, "nearly all-PM" refers to an arrangement in which a large majority of the components for maintaining or controlling polarization include PM components. For example, in various embodiments, nearly all-PM arrangements may incorporate greater than 70%, greater than 80%, or greater than 90% PM components. In various embodiments, nearly all-PM arrangements may include fewer than 2, 3, 5, or 10 non-PM components. Therefore, in systems that do not include a saturable absorber, no saturable absorber damage can occur during Q-switched operation and the laser system can be very robust and long-term reliable.

A NALM is particularly useful in enabling a transition from Q-switched to mode locked operation, because the reflectivity of a NALM saturates at a certain peak power and can even be reduced when the pulse power is further increased. This nonlinear limiting mechanism was already recognized in Fermann et al., 'Nonlinear amplifying loop mirror', Optics Letters, Vol. 15, Issue 13, pp. 752-754 (1990). Hence a NALM can act as a power limiter similar to the power limiters discussed in '887 and '913, enabling the suppression of Q-switching at certain power levels and forcing the transition to mode locked operation. The utilization of a NALM as a power limiter further allows for the reduction of root mean square intensity noise (RIN) of the mode locked laser. Operation of mode locked lasers with low RIN may be important in many applications such as spectroscopy or low phase noise RF generation. By adjusting the phase delay inside a NALM, an operation state with low RIN can be selected. For example, a RIN less than about −140 dBc/Hz at a frequency of 1 MHz can be obtained. In some implementations a RIN less than about −140 dBc/Hz at a frequency of between about 100 kHz and about 1 MHz can also be obtained. Even lower RIN can be obtained with the utilization of diode pump lasers that have themselves a RIN less than about −140 dBc/Hz at any of these frequencies.

Optical filters can also be incorporated into the cavity for wavelength tuning or for operation with high pulse energies in the similariton regime. Also, the amplifier fiber can be implemented external to the fiber loop, where efficient modelocking induced by differential nonlinear phase delays along the two propagation directions of the fiber loop can be obtained by using a value of x<0.50.

The oscillating pulse bandwidth is maximized when compensating the cavity dispersion to near the zero range. It can be beneficial to also compensate $3^{rd}$ order dispersion, as discussed in U.S. Patent Application Pub. No. 2012/0205352, "Compact, coherent, high brightness light sources for the mid and far IR", to Fermann et al.

The repetition rate of the laser can be modulated by moving or scanning the location of mirror 140. If a Tm fiber laser is implemented, the Tm fiber laser can be core pumped in the 1560 nm range or cladding pumping schemes can also be used. Other rare-earth dopants can also be used, for example Ho, Yb, Er, Dy or Nd fiber lasers.

The cavity can also be constructed with non-polarization maintaining fiber, in this case the non-reciprocal phase shifter 120 can be omitted and a fiber polarization controller can be incorporated. In this implementation, it can also be useful to include a Faraday rotator between the WDM collimator and the grating to compensate for the polarization rotation in the NALM.

Figure 2A:
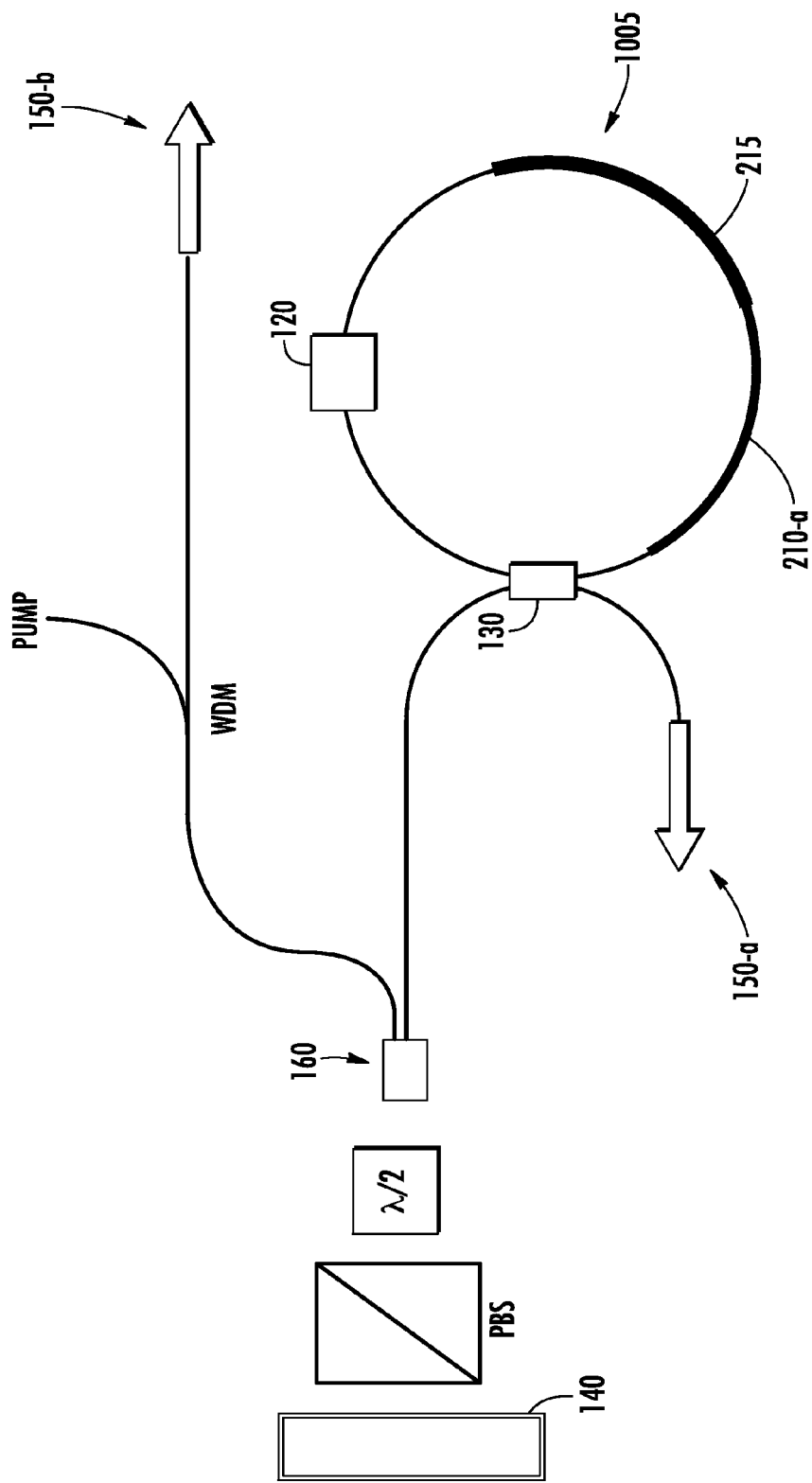
FIG. 2A schematically illustrates an example of a passively mode locked polarization maintaining Ho fiber laser with all fiber dispersion control.

FIG. 2A shows an example of another arrangement incorporating all-fiber dispersion compensation. As illustrated, several components of FIG. 1 may be included in the arrangement. In FIG. 2A the NALM 1005 comprises a rare-earth doped fiber 210-*a*, which, in this example, is Ho-doped. The dispersion of the cavity may be compensated with a dispersion compensation fiber 215, such as a highly Germania doped fiber or an appropriate photonic crystal fiber, which may be undoped. Similarly, a gain fiber with positive dispersion can be used to compensate for the dispersion of a negative dispersion undoped fiber, or the dispersion sign of the gain fiber and undoped fibers reversed while providing for compensation. For example, for the construction of an Nd fiber laser, the dispersion can be compensated with a length of photonic crystal fiber. The photonic crystal fiber may be configured for either positive dispersion or negative dispersion. The absence of a bulk grating compressor in this implementation simplifies the cavity design and allows for improved robustness of the laser. Optical filters can also be introduced into the cavity. In certain implementations dispersion compensation can also be omitted and operation with large values of positive dispersion obtained as, for example, described in U.S. Pat. No. 6,885,683, "Modular, high energy, widely-tunable ultrafast fiber source", to Fermann et al. Saturable absorber mirrors can also be used instead of mirror 140 to facilitate the transition from Q-switching to modelocking. Similar to FIG. 1, a focusing lens L can also be included to increase the light intensity on the saturable absorber mirror. Such a focusing lens is not separately shown in FIG. 2A.

Figure 2B:
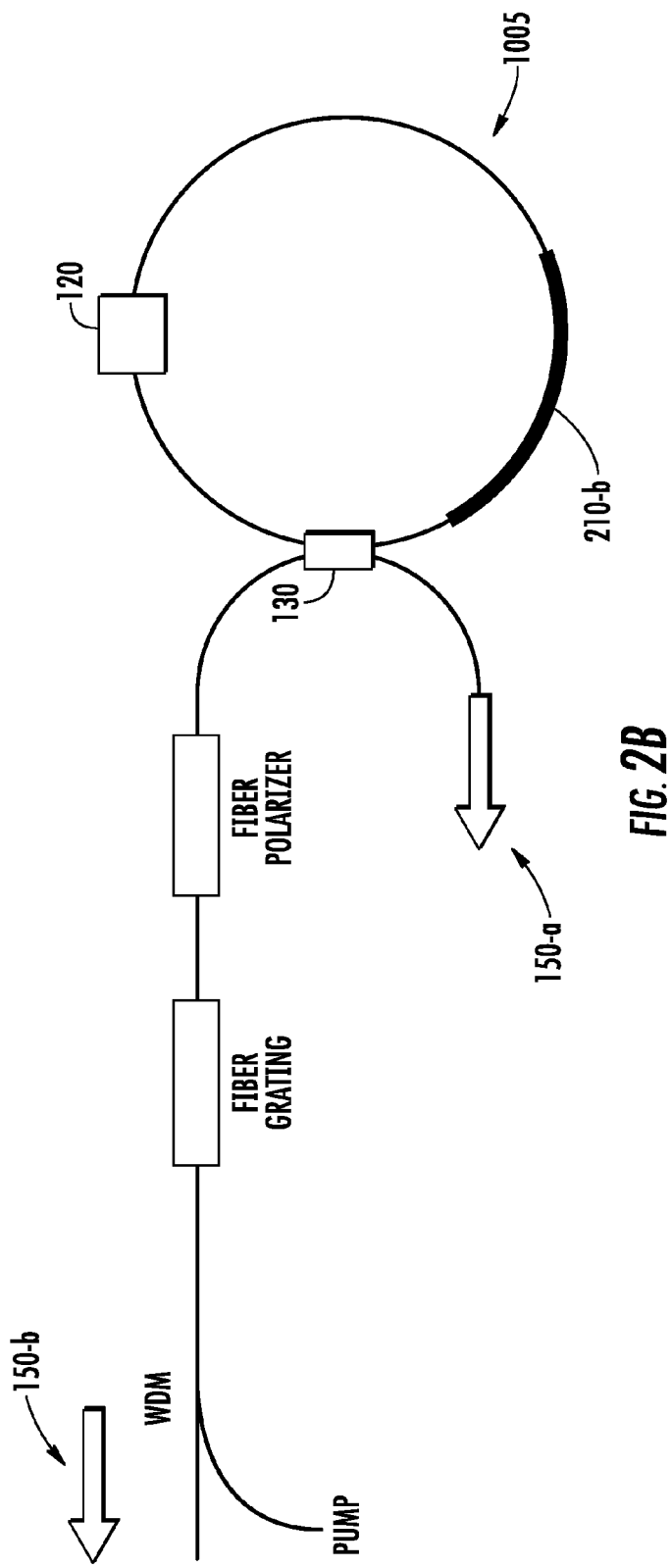
FIG. 2B schematically illustrates an example of an all-fiber passively mode locked polarization maintaining Ho fiber laser incorporating a fiber grating for dispersion control.

FIG. 2B shows an implementation incorporating a fiber Bragg grating for dispersion compensation. In this example a polarization state is selected with a fiber polarizer that is spliced into the cavity. The fiber Bragg grating is used for dispersion compensation and also for pump power coupling as well as signal output. A highly nonlinear fiber can also be spliced into the cavity to reduce the modelocking threshold. If desired the intra-cavity fiber amplifier 210-*b* can be located outside the fiber loop, for example between the fiber grating and the coupler 130, and coupler splitting ratios from x=0.01-0.50 can be implemented.

Figure 2C:
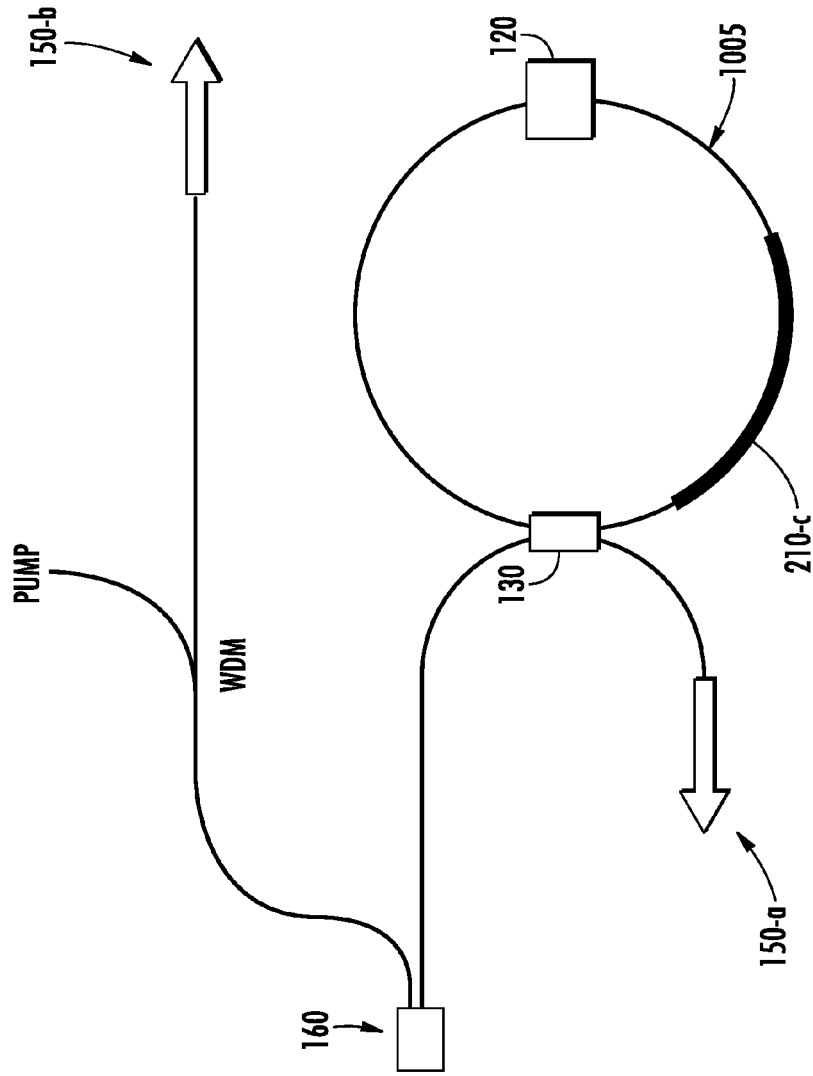
FIG. 2C schematically illustrates an example of a high power Yb similariton fiber laser incorporating a bandpass filter for stability control.

FIG. 2C shows yet another arrangement incorporating a high power Yb similariton fiber laser arranged for operation at low repetition rates, such as repetition rates <20 MHz. In this example the grating G is used only as a narrow bandpass filter providing a bandwidth less than about 10 nm, for example. As explained in U.S. Pat. No. 7,782,910, "Single-polarization high power fiber lasers and amplifiers", to Fermann et al., optical filters can be used to stabilize mode locked pulse formation in the presence of large levels of intra-cavity self-phase modulation. As a result of self-phase modulation, the generated pulses can have a bandwidth larger than the filter bandwidth, which may be a narrow bandpass optical filter with a bandwidth in the range from about 2 nm to about 30 nm in some systems. As in the previous examples, the present arrangement has the benefit that no saturable absorber is required and an all-PM cavity construction is feasible. Also, no dispersion compensation is required. As before, Yb fiber amplifier 210-*c* is only an example, other rare-earth gain media can also be used. A saturable absorber could also be used in place of the mirror 140 to facilitate modelocking. Although this cavity can operate over a wide range of repetition rates, operation at low repetition rates in the range from 1 to 20 MHz is most useful for many applications.

One of the most important applications for mode locked fiber lasers is fiber-based frequency comb generation. NALMs also allow construction of long-term stable fiber frequency combs as shown with respect to FIG. 3. Any or all of the implementations in FIGS. 1-2C may be utilized in a system for frequency comb generation. The loop can also include dispersion compensating fiber 315. The NALM can further be used to enable the construction of long-term stable operation of fiber frequency combs with low RIN, where for example a RIN<−140 dBc/Hz at frequencies somewhere in the range from 100 kHz to 1 MHz can be achieved, where even lower values of RIN can be achieved with the utilization of pump sources that themselves have a RIN<−140 dBc/Hz at least at one frequency in the range from 100 kHz to 1 MHz. Such frequency combs can also include saturable absorber mirrors to facilitate the transition from Q-switching to modelocking, as already discussed with respect to FIGS. 1-2C.

Figure 3:
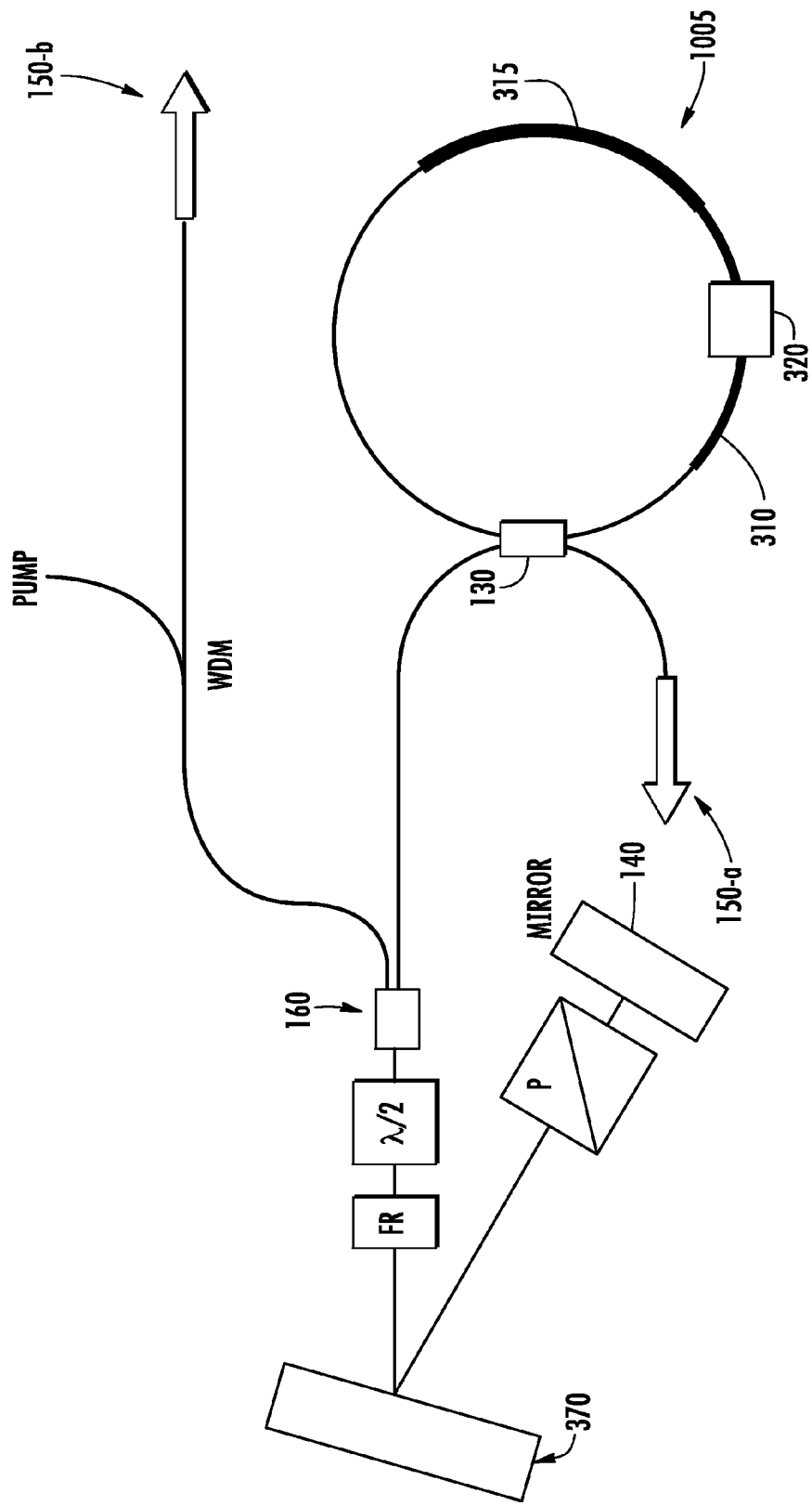
FIG. 3 schematically illustrates an example of a passively mode locked polarization maintaining Tm fiber comb laser with long-term and short term carrier phase control.

In the example of FIG. 3 the nonlinear loop mirror is configured to allow the insertion of a linear phase delay along its two propagation directions (CW or CCW). The NALM 1005 in FIG. 3 includes an orthogonal splice 320 which splices the slow fiber axis to the fast fiber axis of rare-earth doped fiber 310. The orthogonal splice performs the function of the non-reciprocal phase shifter of the previous examples and provides a linear phase delay along the two propagation directions of the NALM. The orthogonal splice can be located anywhere within the NALM loop and can also connect two orthogonal polarization axes of two different intra-loop fibers, such as the rare-earth doped fiber 310 and dispersion compensating fiber 315. This allows for an adjustment of the NALM reflectivity via control of the differential path lengths along the two propagation directions of the NALM. These path lengths can, for example, be controlled by controlling the temperature of a short section of the fiber lengths inside the NALM with a suitable temperature control device, for example a thermoelectric cooler and associated control unit (not shown). For example, the linear phase delay may be stabilized using temperature control of a section of intra-loop fiber, which may include a portion of the active fiber(s), passive fiber(s), or both. Alternatively, an external pressure can also be applied to a short section of fiber. To compensate for the polarization rotation of the orthogonal splice, a Faraday rotator (FR) is also included in this example. Alternatively a quarter waveplate inserted at the location of the Faraday rotator (not shown) can also be used, though this will lead to higher intra-cavity loss. A polarizer in conjunction with the half-wave plate selects a preferred polarization state.

The fiber-based system of FIG. 3, which is suitable for frequency comb generation, also includes a loss modulator 370. Such a loss modulator may include a graphene modulator as described in U.S. 2012/0327959: "Compact optical frequency comb systems", to Fermann et al. In the example of FIG. 3 the loss modulator 370 is configured for operation in reflection, although transmission-based modulation arrangements may be utilized in certain embodiments. The loss modulator allows for rapid control of the carrier envelope offset frequency, $f_{ceo}$, whereas the temperature control of the NALM fibers allows for slow control of the $f_{ceo}$. This can be understood, since any temperature changes of the NALM fibers change the reflectivity of the NALM and therefore the intra-cavity loss as well as the carrier phase of the oscillating pulses. In fact, to induce modelocking the differential path delay or linear phase delay along the two propagation directions of the NALM needs to be set to a certain range (or bias point) in order to start modelocking in some system implementations. Once the bias point is selected, feedback control can be used to stabilize or modulate the linear phase delay at this bias point. This feedback can be implemented via measuring the fiber laser output power or alternatively by directly monitoring the $f_{ceo}$ of the laser with an external f-2f interferometer (not shown) as well known in the state of the art. At the same time control of the linear phase delay can be used for controlling the $f_{ceo}$ of the comb system. The $f_{ceo}$ of the comb system can also be controlled by controlling or modulating the pump power.

The repetition rate of the frequency comb laser can be modulated by wrapping at least a portion of the fiber(s) in the laser onto a piezoelectric fiber coil and modulating the diameter of the fiber coil, by mounting the cavity end mirror 140 on a stage or by mounting the cavity end mirror 140 onto a small PZT. Both slow and fast control of the repetition rate can so be implemented. Various methods of $f_{ceo}$ and repetition rate control are described in U.S. Pat. No. 7,649,915, "Pulsed laser sources", to Fermann et al.

Other cavity configurations as described with respect to FIG. 1 and FIGS. 2A-2C can also be implemented. The orthogonal splice with feedback control can also be used in conjunction with PM fiber as shown with respect to FIGS. 1 and 2A-2C, where an additional Faraday rotator can be included to compensate for the polarization rotation of the orthogonal splice.

Figure 4:
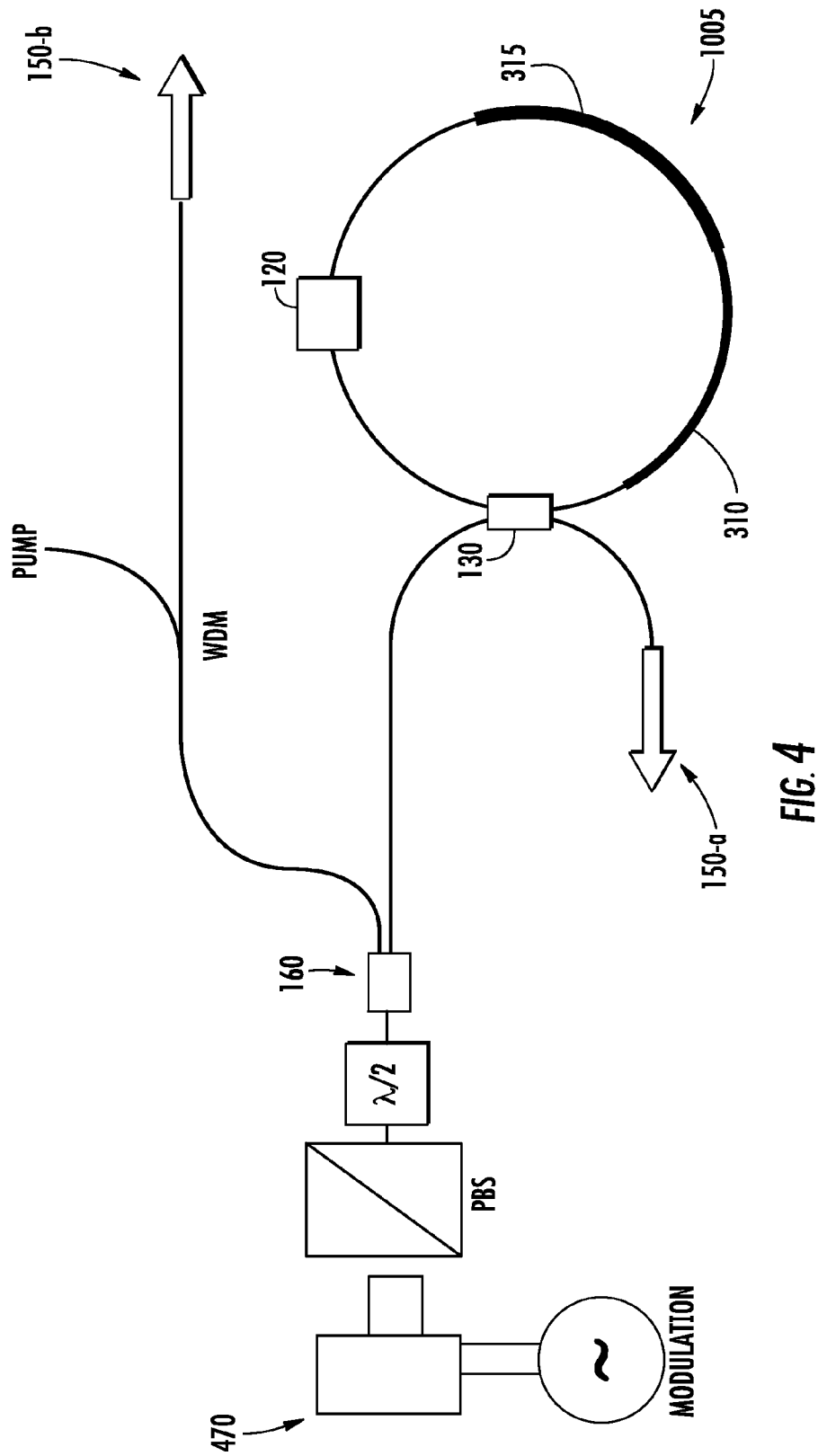
FIG. 4 schematically illustrates an example of a passively mode locked Tm fiber oscillator in conjunction with scanning repetition rates.

Because mode locked fiber lasers implementing NALMs have one free cavity end they are particularly useful for the construction of fiber lasers with scanning repetition rates that can be used for dual scanning delay lines as for example described in U.S. Patent Application Pub. No. 2011/0080580, ('580) "Optical signal processing with modelocked lasers", to Fermann et al, which is hereby incorporated by reference herein in its entirety for all it discloses. An example of such a scanning fiber oscillator is shown in FIG. 4. In this example the oscillator construction is similar to the design described with respect to FIGS. 1-2A. In FIG. 4 the repetition rate of the oscillator is scanned or modulated by modulating the position of the mirror in response to the modulation signal provided to an actuator in assembly 470. It is to be understood that the position modulator assembly 470, an electromechanical arrangement for cavity length control, may be used alone or in combination with an intracavity loss modulator 370 (see, e.g., FIG. 3), which may be an electro-optic modulator (EOM). The oscillator repetition rate can be scanned for example by mounting the mirror on a translation stage or by attaching it to a piezo-electric transducer (PZT). This type of design can also be used in conjunction with all other oscillator designs discussed herein. In some implementations, the electro-optic modulator 370 can be used to initiate modelocking, and in various examples, both electro-optical loss and phase modulators can be incorporated. A bulk EOM 370 can also be used in transmission instead of in reflection. Such an implementation is not separately shown. An EOM can be used in conjunction with all other oscillator designs discussed herein. In some implementations, the EOM can also be used inside the NALM to initiate modelocking. Also, saturable absorbers mirrors can be included to facilitate the transition from Q-switching to modelocking, as discussed above with respect to FIGS. 1-3. Again, as with the implementations of FIGS. 1-3, any rare-earth dopant (or combination of rare-earth dopants) may be implemented.

The construction of scanning delay lines and their applications constructed with lasers with scanning repetition rates were described in '580. As disclosed in '580, incorporated by reference herein, such scanning systems may include two mode locked lasers (coherent dual scanning laser, CDSL) or a single laser configured with a delay line (coherent scanning laser, CSL). By way of example, a single laser configuration (CSL) is described in '580, in at least FIGS. 16-16A and paragraphs 0111-0122. Various CDSLs which, for example, incorporate two mode locked lasers, were described in '580, and in U.S. Pat. No. 8,120,778 ('778), which is hereby incorporated by reference herein in its entirety for all it discloses. At least FIGS. 1-5 and col. 6, line 4—col. 11, lines 36 of '778 illustrate examples of CDSL configurations. An example of a CSL configuration includes a repetition rate modulator configured to modulate the repetition rate at a modulation rate. A delay line can be arranged to receive optical pulses modulated at the repetition rate and to generate pulse pairs. The pulse pairs include an optical pulse and a time delayed replica of the optical pulse, wherein a time delay between pulses of the pulse pair is dependent on the modulation rate. Embodiments of the light sources described herein (e.g., with reference to FIGS. 1-4 described above) can be used in any of the examples of CDSLs and CSLs described in '580 and '778.

Another application of passively mode locked fiber lasers with modulated repetition rates is cavity enhanced spectroscopy, as discussed in U.S. Patent Application No. 61/793,913, "Trace gas detection system", to Fermann et al., filed Mar. 15, 2013 ('3913 provisional application). The present system construction in conjunction with a small mirror and an appropriate PZT allows repetition rate modulation at relatively high modulation rates (e.g., >1 kHz) with low noise as required for precision trace gas analysis. Such as system is suitable for use with a mode locked fiber oscillator arrangement configured to be part of a trace gas detection system which includes an enhancement cavity. This can then be applied to cavity dithering as explained in the '3913 provisional application. By way of example, at least FIG. 4 of the '3913 provisional application schematically illustrates an example of a trace gas detection system in which the output of a frequency comb source or frequency ruler is utilized in combination with an enhancement cavity and Fourier transform spectrometer (FTS) for cavity enhanced spectroscopy. The frequency comb source or frequency ruler can include embodiments of the light sources described herein (e.g., with reference to FIGS. 1-4 described above). The arrangement employs various control mechanisms for monitoring and stabilization of the comb and cavity, including a frequency dither mechanism to lock the ruler or comb frequencies to the enhancement cavity.

Thus, the invention has been described in several embodiments. It is to be understood that the embodiments are not mutually exclusive, and elements described in connection with one embodiment may be combined with, or eliminated from, other embodiments in suitable ways to accomplish desired design objectives.

For purposes of summarizing the present disclosure, certain aspects, advantages and novel features of the present disclosure are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein. No feature or group of features is necessary or indispensable for each embodiment.

The term "or" is used in this application its inclusive sense (and not in its exclusive sense), unless otherwise specified. Thus, the use of "or" in a list is meant to include one, some, or all members of the list. In addition, the articles "a" and "an" as used in this application and the appended claims are to be construed to mean "one or more" or "at least one" unless specified otherwise. As used herein, a phrase such as "nearly all" with regard to a property or characteristic refers to an arrangement of components in which a large majority of the components include that property or characteristic. For example, in various embodiments, "nearly all" arrangements may incorporate greater than 70%, greater than 80%, or greater than 90% components that have the property or characteristic. In various embodiments, "nearly all" arrangements may include fewer than 2, 3, 5, or 10 components that do not have the property or characteristic.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A passively mode locked fiber oscillator comprising:
   a Fabry-Perot cavity comprising:
      a nonlinear fiber amplifying loop mirror (NALM) at a first cavity end, said nonlinear loop mirror configured to allow the insertion of a linear phase delay along two propagation directions of said nonlinear loop mirror,
      wherein said passively mode locked fiber oscillator comprises polarization maintaining (PM) fiber, and wherein mode locking of said fiber oscillator evolves via suppression of Q-switching.

2. The passively mode locked fiber oscillator according to claim 1, wherein said loop mirror comprises:
- an orthogonal splice configured to induce said phase delay, and
- a temperature control device configured to control the temperature of a section of intra-loop fiber.

3. The passively mode locked fiber oscillator according to claim 2, further comprising:
- a mirror, a saturable absorber, or a combination of a mirror with a saturable absorber at a second cavity end; and
- a Faraday rotator inserted proximate to said second cavity end to compensate for a polarization rotation induced by said orthogonal splice.

4. The passively mode locked fiber oscillator according to claim 1, said linear phase delay being stabilized using feedback from the output power of the oscillator.

5. The passively mode locked fiber oscillator according to claim 1, said linear phase delay being used to control a carrier envelope offset frequency of said oscillator.

6. The passively mode locked fiber oscillator according to claim 1, said linear phase delay being induced using a non-reciprocal phase shifter.

7. The passively mode locked fiber oscillator according to claim 1, said fiber oscillator further comprising: a bulk diffraction grating disposed in said cavity for dispersion control of said passively mode locked fiber oscillator.

8. The passively mode locked fiber oscillator according to claim 1, said fiber oscillator further comprising: undoped positive dispersion fiber disposed in said cavity for dispersion control of said polarization maintaining passively mode locked fiber oscillator.

9. The passively mode locked fiber oscillator according to claim 1, said oscillator further comprising: undoped negative dispersion photonic crystal fiber disposed in said cavity for dispersion control of said passively mode locked fiber oscillator.

10. The passively mode locked fiber oscillator according to claim 1, further comprising: a narrow bandpass optical filter, wherein said oscillator generates a pulse bandwidth larger than the bandwidth of said optical filter.

11. The passively mode locked fiber oscillator according to claim 1, further comprising:
- a mirror at a second cavity end, said mirror configured to allow modulation or scanning of the repetition rate of said oscillator in response to a control signal,
- wherein said mode locked fiber oscillator is configured in a coherent dual scanning laser (CDSL) or coherent scanning laser (CSL) configuration.

12. The passively mode locked fiber oscillator according to claim 1, further comprising:
- a mirror at a second cavity end, said mirror configured to allow modulation or scanning of the repetition rate of said oscillator in response to a control signal,
- wherein said mode locked fiber oscillator is configured in a trace gas detection system which includes an enhancement cavity.

13. The passively mode locked fiber oscillator according to claim 1, wherein said passively mode locked fiber oscillator is arranged in an all-PM configuration.

14. The passively mode locked fiber oscillator according to claim 1, wherein said Fabry-Perot cavity comprises a reflective optic at a second cavity end.

15. The passively mode locked fiber oscillator according to claim 14, wherein the reflective optic comprises a mirror, a saturable absorber, or a combination of a mirror with a saturable absorber.

16. The passively mode locked fiber oscillator according to claim 1, wherein the cavity further comprises an electro-optic modulator.

17. The passively mode locked fiber oscillator according to claim 1, wherein the cavity further comprises a loss modulator.

18. The passively mode locked fiber oscillator according to claim 17, wherein the loss modulator comprises a graphene modulator.

19. The passively mode locked fiber oscillator according to claim 1, wherein said NALM is configured as an optical limiting element.

20. The passively mode locked fiber oscillator according to claim 19, wherein said NALM optical limiting element is further configured to produce a fiber oscillator output with a root mean square intensity noise (RIN) less than −140 dBc/Hz at least at one frequency in a range from 100 kHz to 1 MHz.

21. The passively mode locked fiber oscillator according to claim 1, configured as a frequency comb.

22. A passively mode locked fiber oscillator comprising:
a laser cavity comprising:
- a nonlinear fiber amplifying loop mirror, said nonlinear loop mirror configured to allow the insertion of a linear phase delay along two propagation directions of said nonlinear loop mirror,
- wherein said cavity is configured without any saturable absorber and is configured with polarization maintaining (PM) components in an all-PM or nearly all-PM configuration,
wherein mode locking of said fiber oscillator evolves via suppression of Q-switching.

23. The passively mode locked fiber oscillator according to claim 22, wherein said loop mirror comprises:
- an orthogonal splice configured to induce said linear phase delay, and
- a temperature control device configured to control temperature of a section of intra-loop fiber.

24. The passively mode locked fiber oscillator according to claim 22, said linear phase delay being induced using a non-reciprocal phase shifter.

25. The passively mode locked fiber oscillator according to claim 22, wherein the cavity further comprises an electro-optic modulator.

26. The passively mode locked fiber oscillator according to claim 25, wherein said electro-optic modulator is configured to initiate modelocking of said mode locked fiber oscillator.

27. The passively mode locked fiber oscillator according to claim 22, wherein the cavity further comprises a loss modulator.

28. The passively mode locked fiber oscillator according to claim 27, wherein the loss modulator comprises a graphene modulator.

* * * * *